United States Patent [19]

Ando

[11] Patent Number: 5,140,573
[45] Date of Patent: Aug. 18, 1992

[54] OPTICAL INFORMATION RECORDING AND/OR REPRODUCING APPARATUS PROVIDED WITH MEANS FOR DETECTING ON-TRACK/OFF-TRACK SIGNAL BY HOLDING PEAK VALUE AND BOTTOM VALUE

[75] Inventor: Hirotake Ando, Tokyo, Japan

[73] Assignee: Canon Kabushiki Kaisha, Tokyo, Japan

[21] Appl. No.: 404,564

[22] Filed: Sep. 8, 1989

[30] Foreign Application Priority Data

Oct. 6, 1988 [JP] Japan .................. 63-252999

[51] Int. Cl.⁵ .................. G11B 7/085; G11B 7/09
[52] U.S. Cl. .................. 369/44.28; 369/44.34
[58] Field of Search ........... 369/44.32, 44.28, 44.25, 369/44.27, 44.34, 44.41, 44.26

[56] References Cited

U.S. PATENT DOCUMENTS

| | | | |
|---|---|---|---|
| 4,106,058 | 8/1978 | Romeas et al. | 358/128 |
| 4,410,969 | 10/1983 | Maeda | 369/46 |
| 4,530,079 | 7/1985 | Millar | 369/344.34 |
| 4,637,003 | 1/1987 | Yokogawa | 369/32 |
| 4,849,953 | 7/1989 | Nomura et al. | 369/44.28 |
| 4,974,220 | 11/1990 | Harada | 369/44.26 |

FOREIGN PATENT DOCUMENTS 0191467 8/1986 European Pat. Off. .
0224935 6/1987 European Pat. Off. .
2556870 12/1984 France .

Primary Examiner—Donald McElheny, Jr.
Assistant Examiner—Khoi Truong
Attorney, Agent, or Firm—Fitzpatrick, Cella, Harper & Scinto

[57] ABSTRACT

An optical information recording and/or reproducing apparatus includes an optical head for recording and/or reproducing information by applying a light beam to an optical recording medium having a plurality of tracks, an actuator for relatively moving the light beam in a direction which intersects the tracks, an optical detector for detecting, by intersecting the tracks, a reflected or transmitted light of the light beam, which has been modulated, a peak holding circuit for holding a peak value of a signal detected by the optical detector, a bottom holding circuit for holding a bottom value of the detected signal, a circuit for obtaining an intermediate value of the held peak value and bottom value, and a comparison circuit for transmitting an on-track/off-track signal by making a comparison between the intermediate value and the detected signal.

7 Claims, 5 Drawing Sheets

FIG. 7
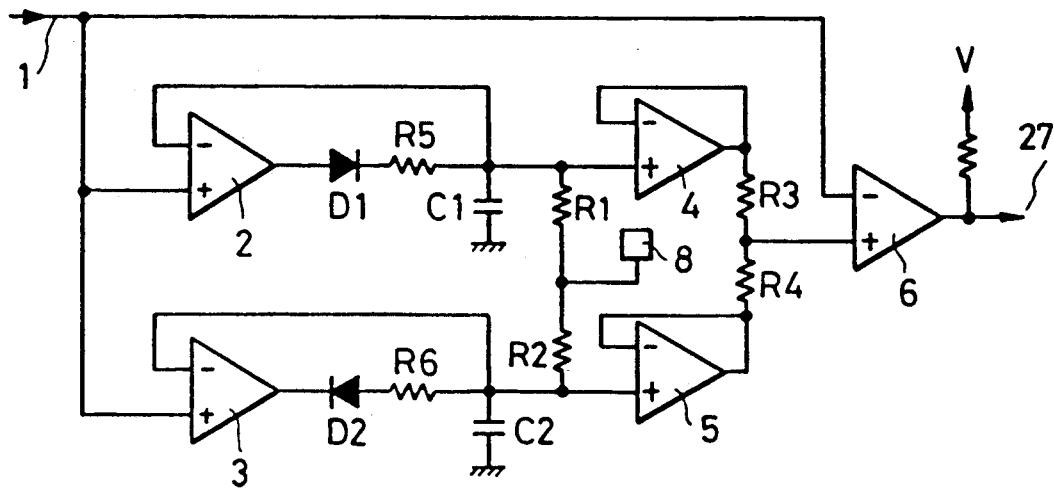
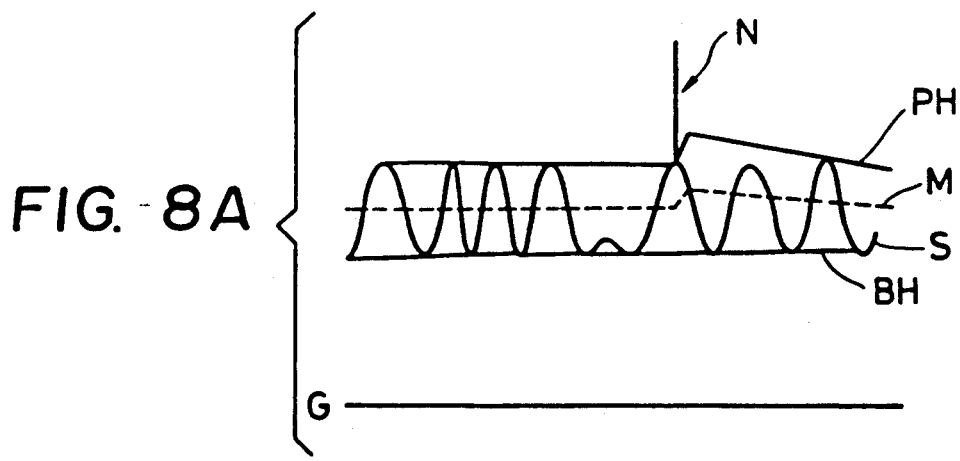
FIG. 8A
FIG. 8B
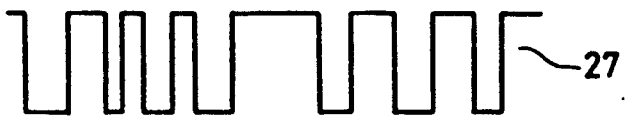

OPTICAL INFORMATION RECORDING AND/OR REPRODUCING APPARATUS PROVIDED WITH MEANS FOR DETECTING ON-TRACK/OFF-TRACK SIGNAL BY HOLDING PEAK VALUE AND BOTTOM VALUE

BACKGROUND OF THE INVENTION

1. Field of the Invention

The present invention relates to an apparatus for recording and/or reproducing information on an optical recording medium by irradiation of a light beam, and, more particularly to an optical information recording and/or reproducing apparatus provided with a means for obtaining an on-track/off-track signal (a track count signal) from reflected light or transmitted light of the light beam.

2. Description of the Prior Art

FIG. 1 is a schematic view which illustrates an example of the structure of a conventional optical information recording/reproducing apparatus. Referring to this drawing, reference numeral 10 represents an optical disk having a surface in which spiral or concentric tracks are formed. This optical disk 10 can be rotated by a spindle motor 11 so that information can be recorded or reproduced as a result of the application of the light beam from an optical head 21. The optical head 21 includes a semiconductor laser 12 which serves as the light source. The light beam emitted from this semiconductor laser 12 is converged on the optical disk 10 after it has passed through a collimator lens 13, a beam splitter 14, and an objective lens 15. The beam reflected from the optical disk 10 is again passed through the objective lens 15, and is separated from the incident beam by the beam splitter 14. Then, the thus-separated beam is detected by a light detector 18 after it has passed through a sensor lens 23. The light receiving surface of this light detector 18 is so divided into a plurality of regions as to have a focusing signal and a tracking signal detected in an autotracking (AT) and autofocusing (AF) control circuit 19 by a known method such as the astigmatism method, the push-pull method, or the like on the basis of the output from each of the above-described divided regions. The method of detecting the control signal of the type described above has been disclosed in, for example, U.S. Pat. No. 4,410,969.

The thus-detected control signal is fed back to a lens actuator 16 so that the autotracking and the autofocusing are enabled by moving the objective lens 15 in the direction of the optical axis of the light beam and in the direction which is perpendicular to the optical axis and also which intersects the track.

In order to access the light beam to a desired track in the apparatus of the type described above, a structure can be employed which is arranged such that the overall body of an optical head 21 is moved by a linear motor 22 in the radial direction of the disk, that is, in the direction which intersects the track. Alternatively, another structure can be employed which is arranged such that the objective lens 15 is moved in the direction which intersects the track by inputting a track jump signal to the lens actuator 16. In order to detect the position or the moving direction of the light beam, an on-track/off-track signal is used in the apparatus of this type. The on-track/off-track signal can be obtained by processing, by an on-track/off-track detection circuit 20, the total signal transmitted from all of the regions in the light detector 18. The utilization of such an on-track/off-track signal has been disclosed, for example, in U.S. Pat. No. 4,106,058.

FIG. 2 is a schematic view which illustrates an example of the conventional on-track/off-track detection circuit. An output (a total signal) 1 from the light detector 18 having the waveform as designated by a symbol S shown in FIG. 3 is subjected to a comparison made, by a comparator 6, with a predetermined reference value C which is approximated to the average of the output 1 and transmitted from a constant-voltage source 8. As a result, an on-track/off-track signal 7 as shown in FIG. 3B is transmitted.

However, in the above-described conventional devices, the total signal from the light detector 18 involves, as designated by the symbol S shown in FIG. 3A, a certain offset with respect to a ground level G and becomes a signal modulated by the track when the light beam intersects the track with the focus servo actuated. Furthermore, the offset and the degree of modulation can be changed corresponding to the change in the reflectance of the disk or the change in the laser power. Therefore, the conventional devices encounter a problem in that the on-track/off-track signal which serves as the output cannot be obtained with satisfactory accuracy, be maintained or, in the worst case, the determination of the on-track and off-track cannot be performed if the change in the offset and in the modulation degree is too large since the comparison voltage is arranged to be a constant level.

SUMMARY OF THE INVENTION

Accordingly, an object of the present invention is to provide an optical information recording and/or reproducing apparatus capable of overcoming the above-described conventional problems and in which an accurate on-track/off-track signal can always be obtained even if the reflectance of the medium or the laser power is changed.

The above-described object can be achieved by an optical information recording and/or reproducing apparatus comprising:

means for recording and/or reproducing information by applying a light beam to an optical recording medium having a plurality of tracks;

means for relatively moving the light beam in a direction which intersects the tracks;

means for detecting a reflected or transmitted light of the light beam which has been modulated by intersecting the tracks;

means for holding a peak value of a signal detected by the detection means;

means for holding a bottom value of the detected signal;

means for obtaining an intermediate value of the held peak value and bottom value; and means for obtaining an on-track/off-track signal by making a comparison between the intermediate value and the detected signal.

BRIEF DESCRIPTION OF THE DRAWINGS

FIG. 7 is a circuit diagram which illustrates another embodiment of the on-track/off-track detection circuit according to the present invention; and FIGS. 8A and 8B are views which illustrate the waveform of the signal in the circuit shown in FIG. 7.

DESCRIPTION OF THE PREFERRED EMBODIMENTS

An embodiment of the present invention will now be described in detail with reference to the drawings.

Figure 1:
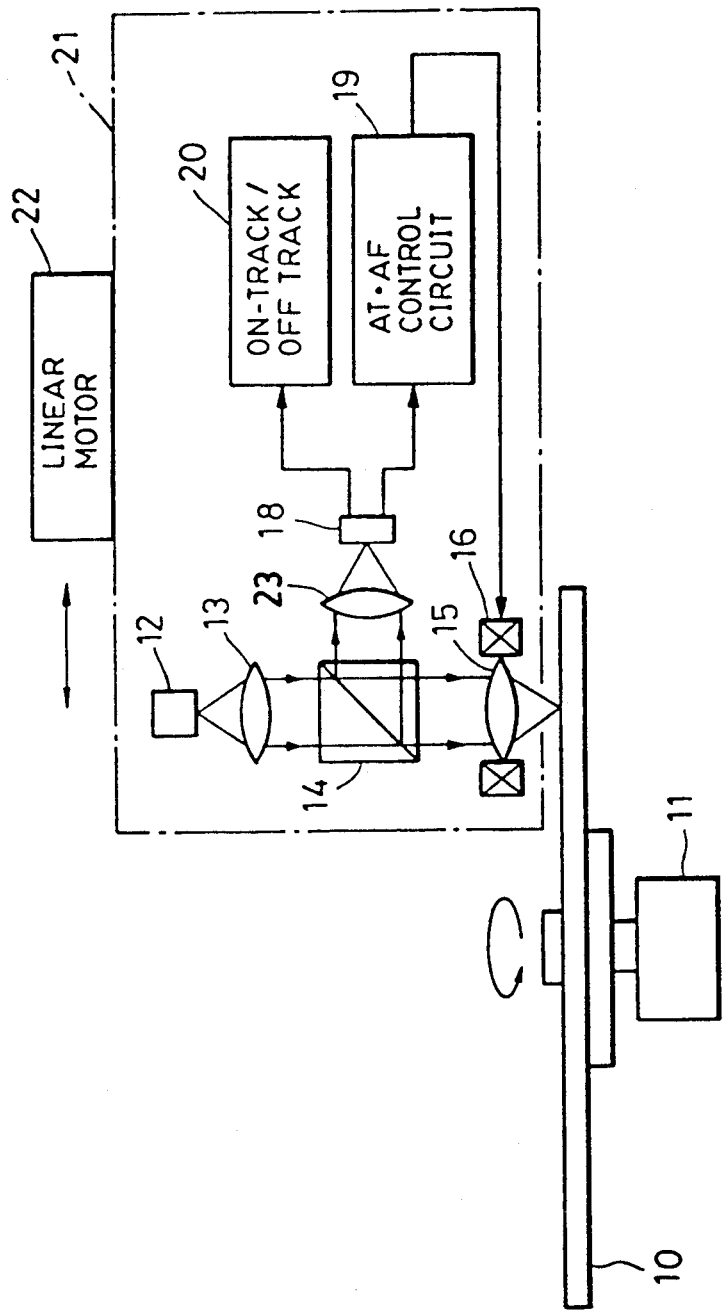
FIG. 1 is a schematic view which illustrates an example of the structure of a conventional optical information recording and reproducing apparatus.
Figure 2:
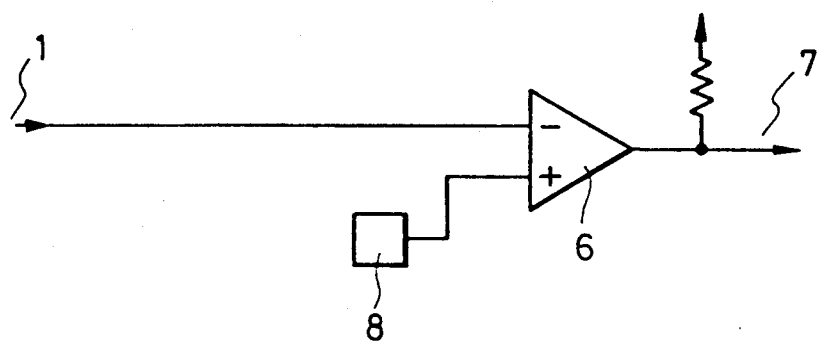
FIG. 2 is a circuit diagram which illustrates an example of a conventional on-track/off track detection circuit.
Figure 3A:
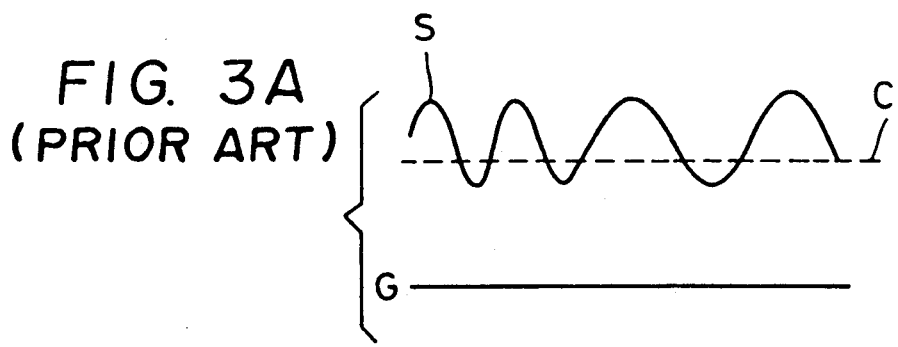
FIGS. 3A and 3B are views which illustrate the waveform of a signal in the circuit shown in FIG. 2.
Figure 3B:
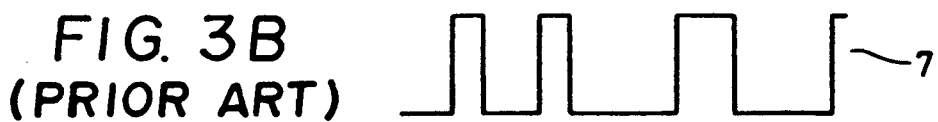
Figure 4:
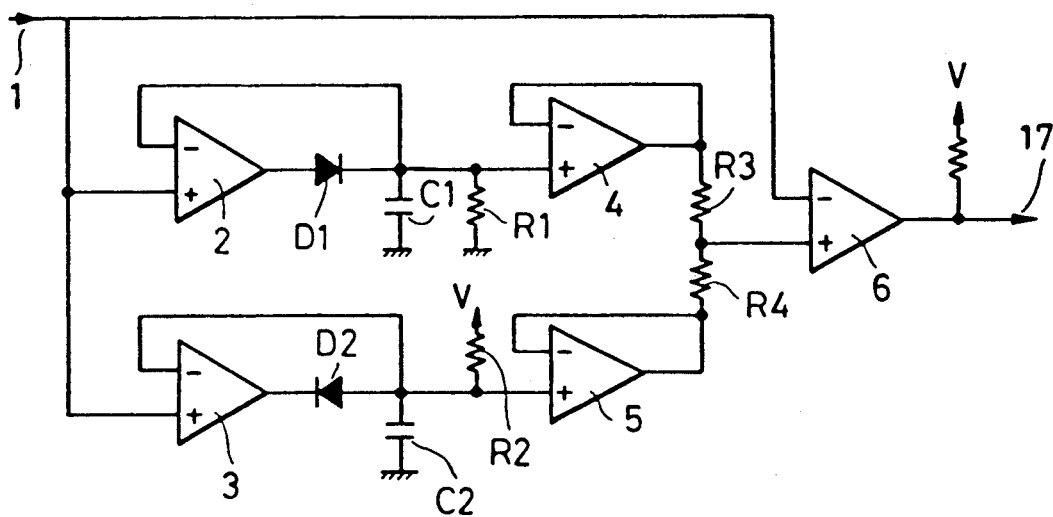
FIG. 4 is a circuit diagram which illustrates an embodiment of the on-track/off-track detection circuit according to the present invention.

FIG. 4 is a view which illustrates an embodiment of an on-track/off-track detection circuit for use in an apparatus according to the present invention. The apparatus according to the invention is structured similarly to the apparatus shown in FIG. 1 except for this circuit. Referring to FIG. 4, reference numeral 1 represents a total signal from a light detector; reference numerals 2 and 4 each represent a differential amplifier which form a peak holding circuit together with a diode D1, a capacitor C1 and a resistor R1; reference numerals 3 and 5 each represent a differential amplifier which form a bottom holding circuit together with a diode D2, a capacitor C2, and a resistor R2; reference characters R3 and R4 represent resistors for processing the intermediate value between the peak held value and the bottom held value; reference numeral 6 represents a comparator for obtaining a binary on-track/off-track signal 17 upon a comparison made between the intermediate value and the total signal 1 from the light detector, this intermediate value being between the peak held value and the bottom held value.

Figure 5A:
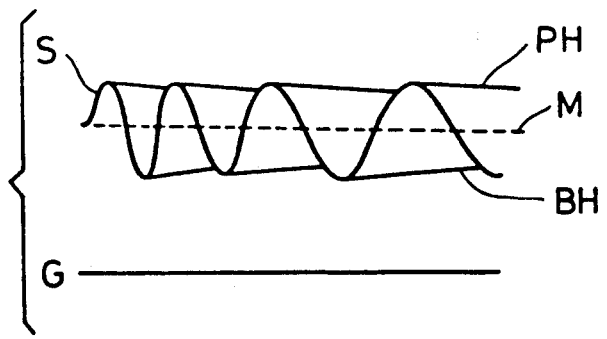
FIGS. 5A and 5B are views which illustrate the waveform of the signal in the circuit shown in FIG. 4.

The total signal 1 from the light detector is input to the differential amplifier 2, and is subjected to a peak holding process performed by diode D1, capacitor C1, and resistor R1. Then, it is transmitted through the buffer performed by the differential amplifier 4. Similarly, the total signal 1 from the light detector input to the differential amplifier 3 is subjected to a bottom holding process performed by diode D2, capacitor C2, and resistor R2. Then, it is transmitted through the buffer performed by the differential amplifier 5. On the basis of the outputs from these differential amplifiers 4 and 5, the intermediate value is calculated by the resistors R3 and R4. The thus-calculated value becomes the intermediate level of the total signal (a modulation signal by the track) from the light detector even if the offset and the degree of modulation of the optical sensor are changed. FIG. 5A illustrates this state, where symbol S represents the waveform of the total signal, PH represents the peak holding signal, BH represents the bottom holding signal, M represents the calculated intermediate value, and G represents the ground level.

Figure 5B:

Therefore, the on-track/off-track signal 17 can be, as shown in FIG. 5B, always transmitted from the comparator 6 by way of performing the comparison made between the total signal 1 and the intermediate value M.

Figures 6A, 6B:
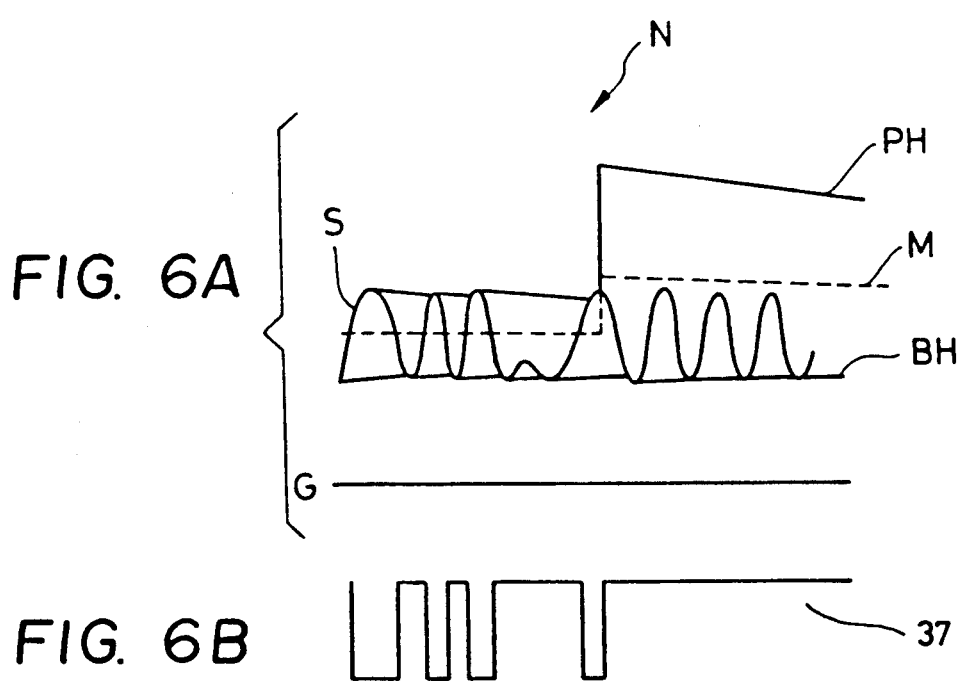
FIGS. 6A and 6B are views which illustrate the waveform of the circuit shown in FIG. 4 when the medium is damaged.

As described above, the apparatus according to the invention is protected from the influence of the change in the reflectance of the medium or change in the laser power. However, the medium can be damaged when it is used. The damage of the medium generates portions with a high reflectance or low reflectance. FIGS. 6A and 6B are views which illustrate the waveform of the circuit shown in FIG. 4 in this state. Referring to FIG. 6A, symbol S represents the waveform of the total signal, PH represents the peak holding signal, BH represents the bottom holding signal, M represents the calculated intermediate value, G represents the ground level, and N represents a portion with a high reflectance. The peak value at a portion N thereof as shown in FIG. 6A can be held intact. As a result, in the apparatus as shown in FIG. 4, it becomes the signal 37 generated as shown in FIG. 6B. This leads to an inability of determining whether the light beam is on-track or off-track during the holding time constant period. Another embodiment of the on-track/off-track detection circuit in which the above-described problem is corrected is shown in FIG. 7.

Referring to FIG. 7, wherein like reference numerals have been used for like elements as in the embodiment of FIG. 4, reference numeral 1 represents a total signal from the light detector; reference numerals 2 and 4 each represent a differential amplifier which form a peak holding circuit together with a diode D1, a capacitor C1 and resistors R1 and R5; reference numerals 3 and 5 each represent a differential amplifier which form a bottom holding circuit together with a diode D2, a capacitor C2, and resistors R2 and R6; reference characters R3 and R4 represent resistors for processing the intermediate value between the peak held value and the bottom held value; reference numeral 6 represents a comparator for obtaining a binary on-track/off-track signal 27 upon a comparison made between the intermediate value of the peak held value and the bottom held value and the total signal 1 from the light detector, and reference numeral 8 represents a constant-voltage source for transmitting voltage which becomes the converged value of the holding circuit.

The total signal 1 from the light detector is input to the differential amplifiers 2 and 3, and is subjected to peak holding and bottom holding processes. At this time, even if a signal of a respectively high level in terms of pulse characteristics is input to the total signal 1 from the light detector, it cannot be immediately responded to by resistor R5, while even if a signal of a respectively low level in terms of pulse characteristics is input to the same, it cannot also be immediately responded to by resistor R6, causing the rising time to be delayed. As a result, the peak and bottom of the pulse cannot be held. This state is shown in FIG. 8A, where symbol N represents a portion with a high reflectance in terms of pulse characteristics, S represents the waveform of the total signal, PH represents the peak holding signal, BH represents the bottom holding signal, M represents the calculated intermediate value, and G represents the ground level. The voltage whose peak has been held is converged to a converged voltage output from the constant-voltage source 8 by a time constant determined by capacitor C1 and resistor R1, while the voltage whose bottom has been held is similarly processed by a time constant determined by capacitor C2 and resistor R2. The voltage whose peak and bottom have been held then passes through the buffers served by the differential amplifiers 4 and 5. Then, the intermediate voltage is obtained by resistors R3 and R4, and the thus-obtained intermediate value is, by the comparator 6, compared to the total signal 1 from the optical sensor. As a result, it becomes the binary on-track/-off-track signal 27 is generated as shown in FIG. 8B.

According to this embodiment, the on-track state and the off-track state can be correctly determined even if the tracking servo-loop is closed by way of setting the converged peak held/bottom held voltage which has been transmitted from the constant-voltage source 8 to the average value (intermediate value determined in consideration of the dispersion of the peak value and the bottom value of the modulation signal due to the track).

The invention can be applied to a variety of applications in addition to the above-described embodiments. For example, although the reflected light from the medium is detected according to the embodiments, a structure can be formed in a case of a light transmissible type medium such that the transmitted light is arranged to be detected. In addition, any shape of the medium may be employed such as a card-like shape and a tape-like shape.

The invention includes all of the applications within the scope of the claims.

What is claimed is:

1. An optical information recording and/or reproducing apparatus comprising:
    means for recording and/or reproducing information by applying a light beam to an optical recording medium having a plurality of tracks;
    means for relatively moving the light beam in a direction which intersects the tracks;
    detection means for detecting a reflected or transmitted light of the light beam which has been modulated by intersecting the tracks;
    peak holding means for holding a peak value of a signal detected by said detection means;
    bottom holding means for holding a bottom value of the detected signal;
    means for obtaining an intermediate value of the held peak value and bottom value;
    means for obtaining an on-track/off-track signal by making a comparison between the intermediate value and the detected signal; and
    means for delaying a rising response of said peak holding means and said bottom holding means.

2. An optical information recording and/or reproducing apparatus according to claim 1, further comprising means for determining a converged value of said peak holding means and said bottom holding means, the converged value being an average value of the detected signal.

3. An optical information recording and/or reproducing apparatus comprising:
    an optical head for recording and/or reproducing information by applying a light beam to an optical recording medium having a plurality of tracks;
    an actuator for relatively moving the light beam in a direction which intersects the tracks;
    a light detector for detecting a reflected or transmitted light of the light beam which has been modulated by intersecting the tracks;
    a peak holding circuit for holding a peak value of a signal detected by said light detector;
    a bottom holding circuit for holding a bottom value of the detected signal;
    a circuit for obtaining an intermediate value of the held peak value and bottom value;
    a comparison circuit for transmitting an on-track/off-track signal by making a comparison between the intermediate value and the detected signal; and
    a circuit for delaying a rising response of said peak holding circuit and said bottom holding circuit.

4. An optical information recording and/or reproducing apparatus according to claim 3, further comprising a constant-voltage source for generating a converged value of said peak holding circuit and said bottom holding circuit.

5. An optical information recording and/or reproducing apparatus according to claim 3, wherein said optical head comprises a light source for emitting the light beam and an optical system for converging the light beam emitted from said light source onto the medium.

6. An optical information recording and/or reproducing apparatus according to claim 5, wherein said actuator comprises a motor for moving said optical head and a lens actuator for moving a portion of said optical system.

7. An optical information recording and/or reproducing apparatus according to claim 3, wherein said peak holding circuit and said bottom holding circuit each comprises a differential amplifier, a diode, a capacitor, and a resistor.

* * * * *